(12) United States Patent
Hamada et al.

(10) Patent No.: US 9,583,925 B2
(45) Date of Patent: Feb. 28, 2017

(54) GASKET FOR ELECTRICAL JUNCTION BOX OF RAILCAR AND ELECTRICAL JUNCTION BOX OF RAILCAR

(71) Applicant: KAWASAKI JUKOGYO KABUSHIKI KAISHA, Hyogo (JP)

(72) Inventors: Masahiro Hamada, Kobe (JP); Hideki Fukumoto, Kobe (JP); Teruaki Mizukawa, Akashi (JP); Masahiro Sakahira, Kobe (JP); Tomohiro Narita, Kobe (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 0 days.

(21) Appl. No.: 14/960,725

(22) Filed: Dec. 7, 2015

(65) Prior Publication Data

US 2016/0197462 A1 Jul. 7, 2016

(30) Foreign Application Priority Data

Dec. 8, 2014 (JP) ................................. 2014-247602

(51) Int. Cl.
*H02G 3/08* (2006.01)
*F16J 15/06* (2006.01)

(52) U.S. Cl.
CPC .............. *H02G 3/088* (2013.01); *F16J 15/06* (2013.01)

(58) Field of Classification Search
USPC .......................................................... 174/50
See application file for complete search history.

(56) References Cited

U.S. PATENT DOCUMENTS

| 6,069,317 A * | 5/2000 | Wagganer | H02G 3/088 174/650 |
| 6,624,990 B1 * | 9/2003 | Lortscher | H01H 9/04 361/42 |
| 8,222,522 B1 * | 7/2012 | Easthouse | H02G 3/088 174/66 |

FOREIGN PATENT DOCUMENTS

| JP | 2004-072876 A | 3/2004 |
| JP | 2011-171617 A | 9/2011 |

* cited by examiner

*Primary Examiner* — Dhirubhai R Patel
(74) *Attorney, Agent, or Firm* — Studebaker & Brackett PC (57) ABSTRACT

A gasket for an electrical junction box of a railcar is fitted in a groove portion formed on a contact surface of a side wall portion or a contact surface of a cover in the electrical junction box including: a box main body having the side wall portion defining an opening communicating with an outer space; and the cover closing the opening. Further, the gasket for the electrical junction box of the railcar includes: small width portions, a width of each of the small width portions being smaller than a width of the groove portion; and large width portions each having projections projecting toward both respective sides of the small width portion in a width direction and having a larger width than the width of the small width portions. The small width portions and the large width portions are alternately provided.

8 Claims, 8 Drawing Sheets

GASKET FOR ELECTRICAL JUNCTION BOX OF RAILCAR AND ELECTRICAL JUNCTION BOX OF RAILCAR

CROSS REFERENCE TO RELATED APPLICATION

The present application claims priority from Japanese Patent Application No. 2014-247602 filed on Dec. 8, 2014 with the Japan Patent Office, the disclosure of which is incorporated herein by reference in its entirety.

TECHNICAL FIELD

The present disclosure relates to a gasket for an electrical junction box of a railcar and the electrical junction box of the railcar.

BACKGROUND

In railcars, power supply from a carbody to a motor and power collection from a third rail (power supply rail) to the carbody by a current collector provided at a bogie are performed through electric cables. Since the carbody and the bogie are separated from each other at the time of maintenance, the electric cable is configured to be disconnectable at a connector or an electrical junction box. The connector or the electrical junction box is attached to a bogie frame of the bogie, and all of these components are exposed to an outer space.

Therefore, if the electrical junction box is exposed to rain water or car washing water at the time of car washing (hereinafter simply referred to as "water"), the water may intrude into an inside of the electrical junction box. For example, to prevent the water from intruding through a cable introducing portion into which the electric cable is inserted, known as a waterproofing measure of the electrical junction box is a configuration including: an elastic member having a through hole through which the electric cable penetrates; and divided press casings covering the elastic member (see Japanese Laid-Open Patent Application Publication No. 2011-171617, for example).

Known as one example of the electrical junction box is an electrical junction box including: a box main body which is open upward; and a cover covering the box main body from above. According to this electrical junction box, if the waterproofing between the box main body and the cover is incomplete, the water easily intrudes into the inside of the electrical junction box from outside. One example of a waterproofing structure is a structure in which a gasket made of rubber is provided in a groove formed at a coupling portion between the box main body and the cover. However, if the gasket is fitted in the groove which includes not only straight portions but also curved and/or meandering portions, a contact state between the box main body and the cover may become unstable, and the water may intrude into the inside of the electrical junction box.

If the gasket is attached to the cover, the gasket may fall off from the cover when attaching the cover to the box main body.

To prevent the contact state of the gasket from becoming unstable and also prevent the gasket from falling off, the gasket needs to be provided in the groove without any gap. However, the electrical junction box is exposed to the outer space, so that there is a possibility that when the electrical junction box is placed under a high-temperature circumstance during the operation of the railcar or the like, the gasket made of rubber expands by heat, and pressure generated by the heat expansion of the gasket is applied to the box main body or the cover, and as a result, the box main body or the cover deforms.

An object of the present disclosure is to provide a gasket for an electrical junction box of a railcar, the gasket being capable of securing water-tightness between a box main body and a cover, preventing the gasket from falling off when attaching the cover, and reducing pressure applied to the box main body or the cover by the heat expansion of the gasket, and the electrical junction box of the railcar.

SUMMARY OF THE INVENTION

A gasket for an electrical junction box of a railcar according to one aspect of the present disclosure is a gasket for an electrical junction box of a railcar, the electrical junction box including: a box main body including a side wall portion defining an opening communicating with an outer space; and a cover closing the opening, the gasket being fitted in a groove portion formed on a contact surface of the side wall portion or a contact surface of the cover, the gasket comprising: small width portions, a width of each of the small width portions being smaller than a width of the groove portion; and large width portions each having projections projecting toward both respective sides of the small width portion in a width direction and having a larger width than the width of the small width portions, the small width portions and the large width portions being alternately provided.

According to this configuration, the gasket for the electrical junction box of the railcar includes the small width portions and the large width portions, and the large width portions and the small width portions are alternately provided. With this, each of the large width portions contacts both side surfaces of the groove portion, and each of the small width portions are easily positioned at the center of the groove portion in the width direction. With this, a clearance between the small width portion and one of both side surfaces of the groove portion and a clearance between the small width portion and the other of both side surfaces of the groove portion are maintained so as to be substantially equal to each other. When the cover and the side wall portion of the box main body face each other, the deformation of the small width portions in the groove portion becomes uniform in the circumferential direction. Thus, a repulsive force of the gasket stabilizes. Therefore, water-tightness between the box main body and the cover is secured, and water can be prevented from intruding into the electrical junction box from the outer space. Since each of the large width portions contact both side surfaces of the groove portion, the gasket does not fall off from the groove portion. Further, since it becomes easy to position the small width portion of the gasket at the center of the groove portion in the width direction, an expansion margin is formed between the groove portion and the small width portion. With this, even if the electrical junction box is placed under a high-temperature circumstance during the operation of the railcar or the like, a case where excessive pressure acts on the box main body or the cover by the heat expansion of the gasket can be prevented. Thus, the electrical junction box can be prevented from cracking or the like.

An electrical junction box of a railcar according to another aspect of the present disclosure includes: a box main body including a side wall portion defining an opening communicating with an outer space; a cover covering the box main body and closing the opening; a gasket fitted in a groove portion formed on a contact surface of the side wall portion or a contact surface of the cover; and an elastic member accommodated in the box main body so as to be located adjacent to the side wall portion, the gasket including small width portions, a width of each of the small width portions being smaller than a width of the groove portion, and a plurality of large width portions each having projections projecting toward both respective sides of the small width portion in a width direction and having a larger width than the width of the small width portions, the small width portions and the large width portions being alternately provided, and one of the projections of the large width portion located adjacent to the elastic member among the plurality of large width portions overlapping the elastic member.

According to this configuration, as with the above configuration, the pressure acting on the box main body or the cover by the heat expansion can be reduced while securing the water-tightness between the box main body and the cover. Further, when the cover and the box main body face each other, the projection of the large width portion overlaps the elastic member in a plan view. Therefore, the large width portion of the gasket contacts the elastic member, so that the water-tightness between the elastic member and the gasket can be secured.

An electrical junction box of a railcar according to yet another aspect of the present disclosure includes: a box main body including a side wall portion defining an opening communicating with an outer space; a cover closing the opening; and a loop-shaped gasket fitted in a groove portion formed on a contact surface of the side wall portion or a contact surface of the cover, the groove portion including straight portions and corner portions each including at least one inflection point, the gasket including small width portions, a width of each of the small width portions being smaller than a width of the groove portion, and large width portions each having projections projecting toward both respective sides of the small width portion in a width direction and having a larger width than the width of the small width portions, the small width portions and the large width portions being alternately provided, and each of the projections of the large width portion fitted in the corner portion having such a shape that a length of the projection of the large width portion in the circumferential direction of the gasket decreases as the projection extends toward an outer side of the small width portion in the width direction.

According to this configuration, the large width portion including the projection having such a shape that the length of the projection in the circumferential direction of the gasket decreases as the projection extends toward the outer side of the small width portion in the width direction is fitted in the corner portion including the inflection point, that is, the meandering corner portion. Therefore, a contact area between the large width portion and the corner portion becomes small, so that pressure applied from the corner portion to the large width portion hardly influences the small width portion. With this, the small width portion of the gasket is easily positioned at the center of the meandering corner portion in the width direction, so that the water-tightness between the box main body and the cover can be improved.

DETAILED DESCRIPTION

Hereinafter, embodiments will be explained in reference to the drawings. The same reference signs are used for the same or corresponding components in the drawings, and a repetition of the same detailed explanation is avoided.

First Embodiment

Figure 1:
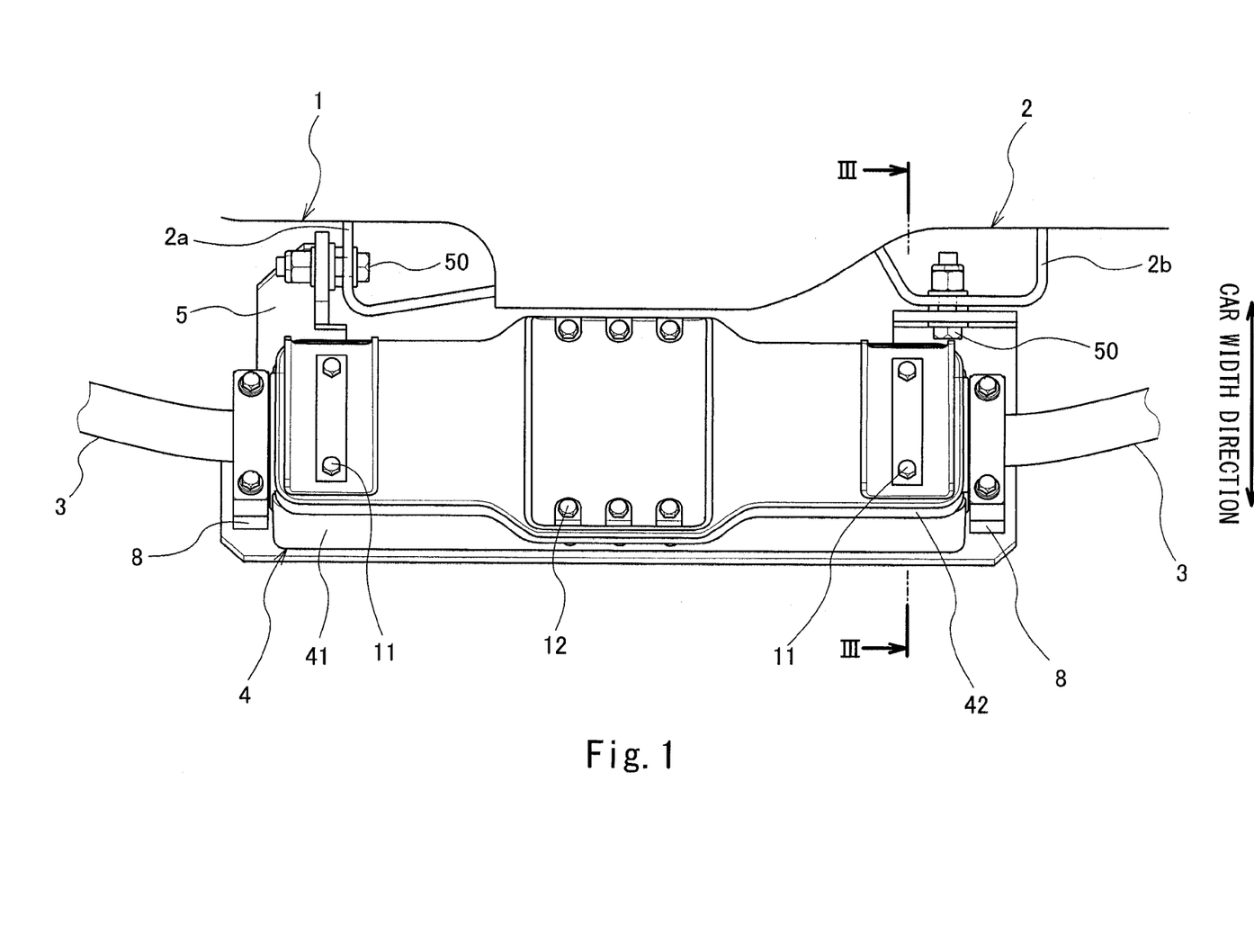
FIG. 1 is a diagram showing an electrical junction box of a railcar according to a first embodiment when viewed from above, the electrical junction box being attached to a bogie of the railcar.

FIG. 1 is a diagram showing an electrical junction box 4 attached to a bogie 1 for a railcar, when viewed from above. The bogie 1 is provided with a motor as a power unit and a current collector for a third rail (both not shown). The current collector supplies electric power to a carbody through an electric cable 3. An end portion of the electric cable 3 is accommodated in the electrical junction box 4.

As shown in FIG. 1, the electrical junction box 4 includes a box main body 41 and a cover 42, which are made of resin such as plastic. The electrical junction box 4 has a substantially rectangular solid shape that is long in a car longitudinal direction. Guide members 8 configured to position the electric cable 3 are provided at both respective sides of the box main body 41 in the car longitudinal direction. The electrical junction box 4 is attached to an outer surface of a bogie frame 2 of the bogie 1 through mounting brackets 5 and is exposed to an outer space. The electrical junction box 4 is attached to the outer surface of the bogie frame 2 through supports 2a and 2b. The supports 2a and 2b project toward the mounting brackets 5 from a car width direction outer side surface of a side sill of the bogie frame 2. The mounting brackets 5 are attached to the supports 2a and 2b of the side sill of the bogie frame 2 by fasteners (such as bolts) 50.

Figure 2:
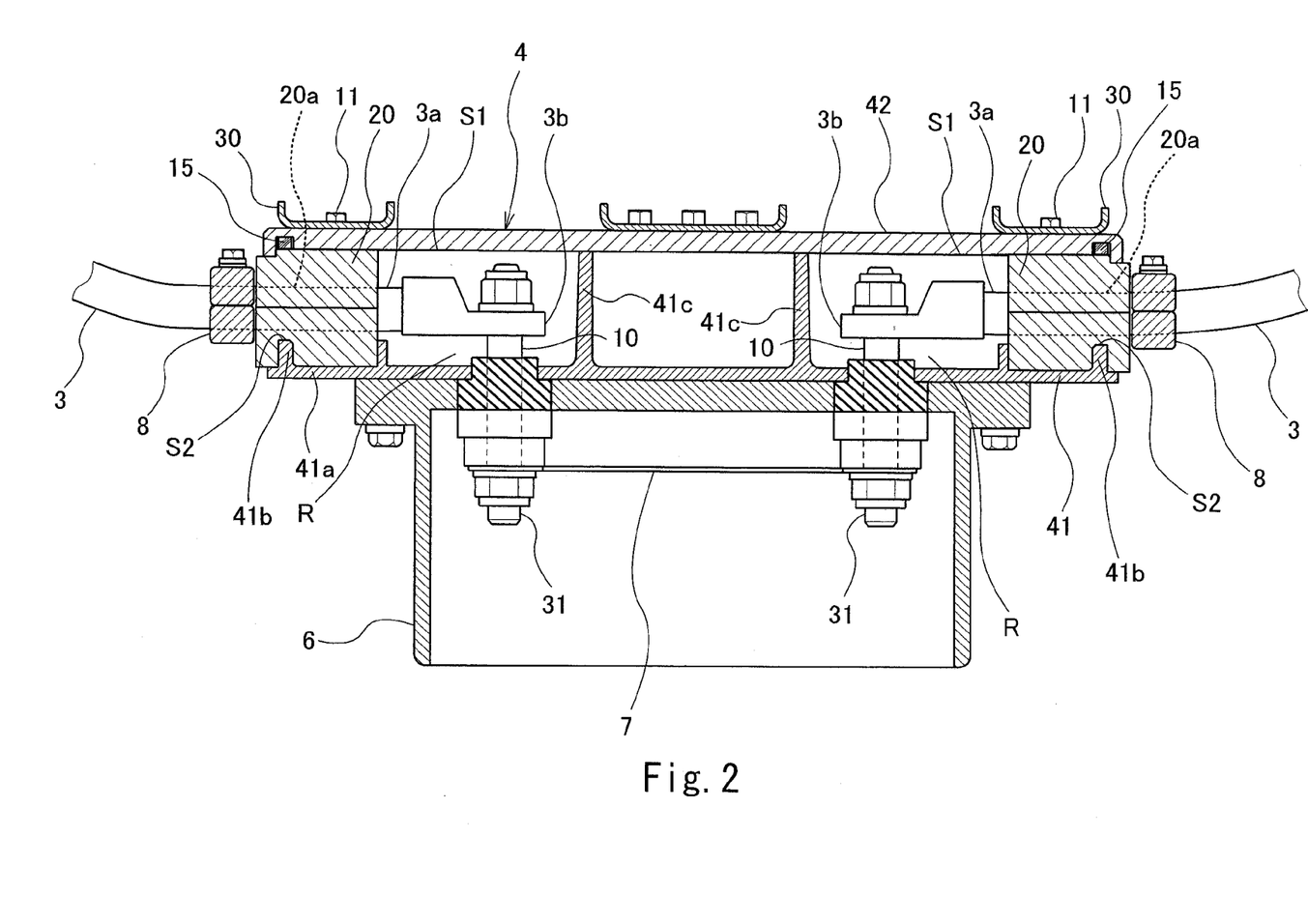
FIG. 2 is a diagram showing a cross section of the electrical junction box of the railcar of FIG. 1, the cross section being obtained by cutting the electrical junction box in a car longitudinal direction.

FIG. 2 is a diagram showing a cross section of the electrical junction box 4 of FIG. 1, the cross section being obtained by cutting the electrical junction box 4 in the car longitudinal direction. As shown in FIG. 2, a fuse box 6 is attached to a lower portion of the electrical junction box 4. The electric cable 3 is divided into two parts at front and rear sides of the electrical junction box 4, and these two parts are connected to each other through a fuse 7. The box main body 41 is provided with openings S1 communicating with the outer space, and the openings S1 are closed by the cover 42. The cover 42 is fixed to the box main body 41 by a plurality of first fasteners 11 and a plurality of second fasteners 12 (see FIG. 1). The first fasteners 11 and the second fasteners 12 are bolts, for example.

Figure 3:
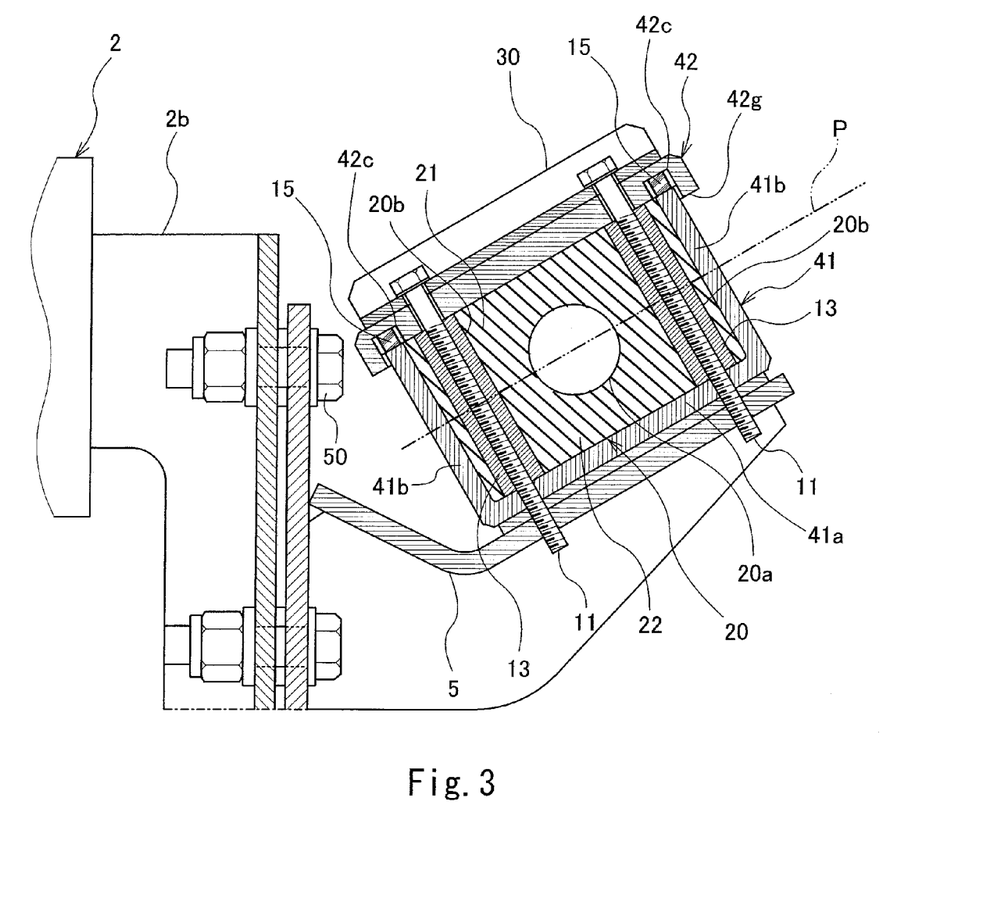
FIG. 3 is a cross-sectional view taken along line III-III of FIG. 1.

FIG. 3 is a cross-sectional view taken along line III-III of FIG. 1. As shown in FIG. 3, the electrical junction box 4 is fixed to the mounting bracket 5 so as to be inclined from a horizontal plane toward the support 2b of the bogie frame 2. With this configuration, it is easy for an operator to visually confirm whether or not the fuse 7 in the fuse box 6 attached to the lower portion of the electrical junction box 4 is melted down. A metal plate 30 is stacked on an upper surface of the cover 42. The first fasteners 11 penetrate the metal plate 30, the cover 42, and the box main body 41 to be fixed to the mounting bracket 5. A size of the cover 42 in a width direction (short-length direction) is larger than a size of the box main body 41 in the width direction. An extension portion 42g extends downward from a peripheral edge of the upper surface of the cover 42. A gasket 15 is provided between the box main body 41 and the cover 42. A detailed shape of the gasket 15 will be described later.

As shown in FIGS. 2 and 3, the box main body 41 of the electrical junction box 4 includes: a bottom wall portion 41a; a side wall portion 41b projecting upward from a peripheral edge of the bottom wall portion 41a; a pair of dividing wall portions 41c dividing a space surrounded by the bottom wall portion 41a and the side wall portion 41b. A stud terminal 10 projecting from the fuse box 6 and an elastic member 20 are accommodated in a space R surrounded by the bottom wall portion 41a, the side wall portion 41b, and the dividing wall portion 41c. The side wall portion 41b defines the openings S1 and openings S2 communicating with the outer space.

Figure 4:
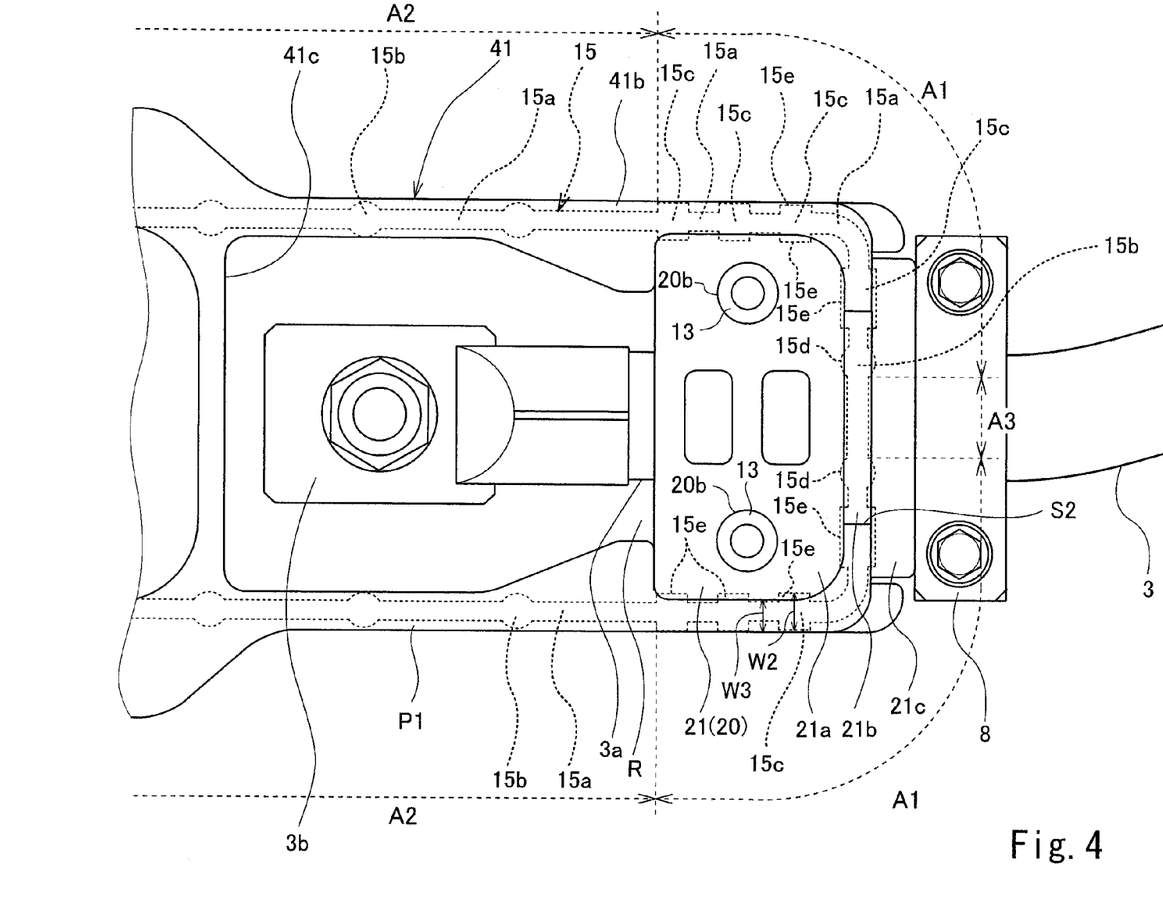
FIG. 4 is a plan view showing a part of a box main body from which a cover of the electrical junction box of FIG. 1 is detached.

An upper end surface of the side wall portion 41b is a contact surface P1 when the cover 42 is fixed to the box main body 41 (see FIG. 4). The pair of dividing wall portions 41c extending upward from a substantially longitudinally middle portion of the bottom wall portion 41a are walls defining the spaces R.

As shown in FIG. 2, a terminal 3b of the electric cable 3 is attached to the stud terminal 10. A current flowing through the electric cable 3 flows through the stud terminal 10 to the fuse 7 accommodated in the fuse box 6. When overcurrent flows through the electric cable 3, the fuse 7 is melted down to break a circuit. Thus, electrical apparatuses of the carbody are protected from the overcurrent.

Since the current collector provided at the bogie 1 collects electricity from a high voltage wire of the third rail, a high current also flows through the electric cable 3. If two divided parts of the electric cable 3 are accommodated in the electrical junction box 4 such that a distance between the two parts of the electric cable 3 is shorter than each of a reference creeping distance and a reference gap distance, electric discharge may occur, the stud terminals 10 and the like connected to the electric cable 3 may be damaged. Therefore, in the box main body 41 of the electrical junction box 4, the adequate creeping distance and the adequate gap distance need to be secured from the terminal 3b of the electric cable 3 connected to the current collector to the surroundings.

FIG. 4 is a plan view showing a part of the box main body 41 from which the cover 42 of the electrical junction box 4 of FIG. 1 is detached. As shown in FIG. 4, the elastic member 20 is provided so as to close the opening S2. The elastic member 20 is accommodated in the box main body 41 so as to be located adjacent to a corner portion of the side wall portion 41b. The elastic member 20 is made of rubber. The elastic member 20 includes: an insertion hole 20a (see FIG. 3) penetrating the electrical junction box 4 in a longitudinal direction of the electrical junction box 4, the electric cable 3 being inserted through the insertion hole 20a; and through holes 20b through which the first fasteners 11 are inserted in an upward/downward direction. The through holes 20b are formed away from the insertion hole 20a toward an outer surface side of the elastic member 20 so as not to overlap the insertion hole 20a in a plan view.

As above, the through holes 20b are formed on the elastic member 20. Therefore, when the cover 42 is fixed to the box main body 41 by the first fasteners 11, compressive force acts on the elastic member 20, and the contact of the elastic member 20 with the box main body 41 and the cover 42 can be strengthened. To prevent excessive force from being applied to the box main body 41 and the cover 42, a tubular spacer 13 covering an outer periphery of the first fastener 11 is inserted in the through hole 20b. In the present embodiment, the elastic member 20 is divided into upper and lower parts by a parting line P extending through a center of the insertion hole 20a and parallel to the cover 42 (see FIG. 3). To be specific, the elastic member 20 includes an upper elastic member 21 and a lower elastic member 22.

The upper elastic member 21 integrally includes a main body portion 21a, a first projecting portion 21b, and a second projecting portion 21c. The main body portion 21a is accommodated in the space R of the box main body 41. The first projecting portion 21b projects from the main body portion 21a toward an outer side of the electrical junction box 4 in the longitudinal direction to be fitted in the opening S2. The second projecting portion 21c projects from the first projecting portion 21b to an outside of the opening S2. An outer surface of the second projecting portion 21c is covered with the guide member 8.

Figure 5:
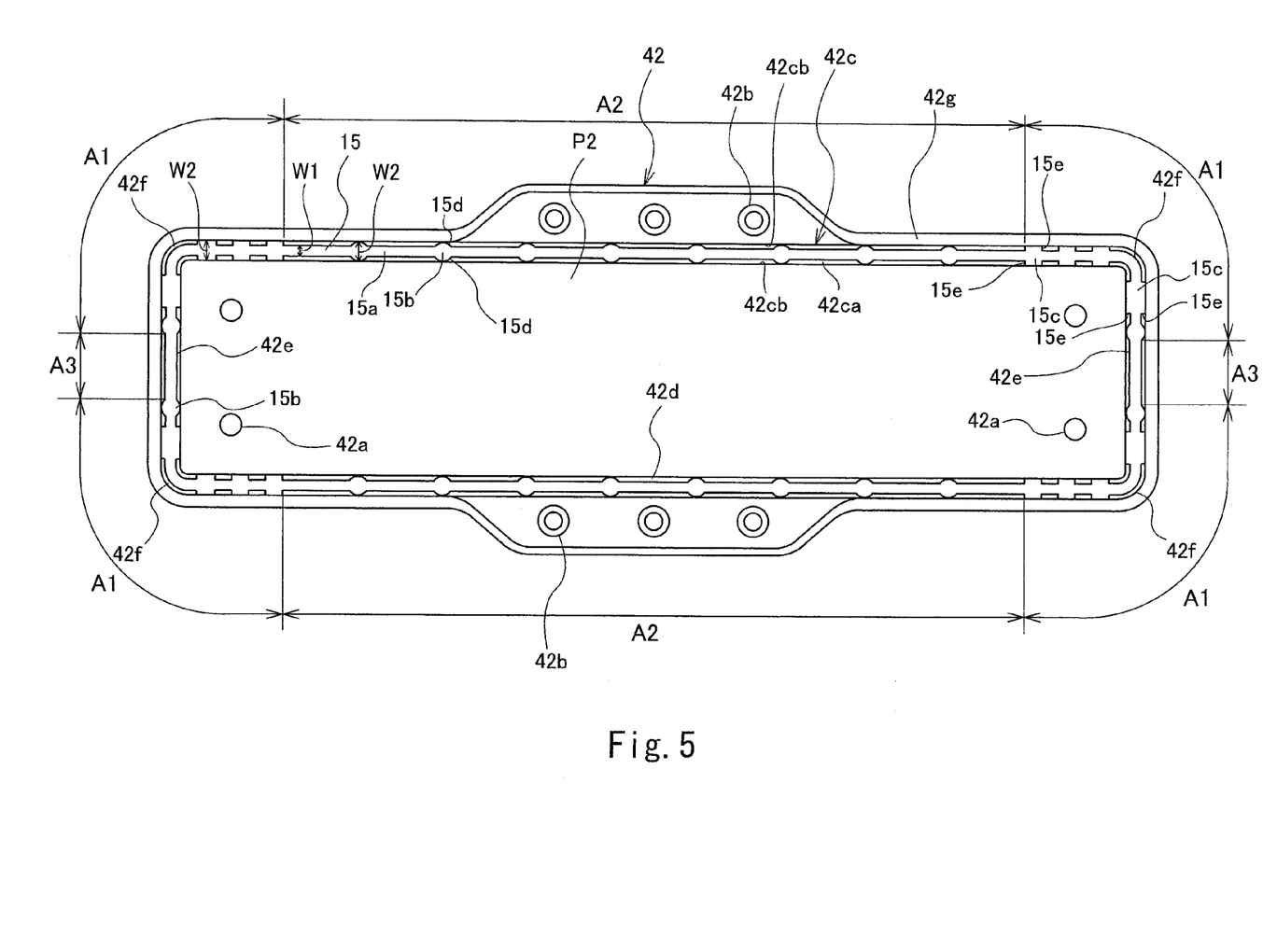
FIG. 5 is a plan view showing the cover of the electrical junction box of FIG. 1 when viewed from the box main body side.

FIG. 5 is a plan view showing the cover 42 of the electrical junction box 4 of FIG. 1 when viewed from the box main body 41 side. To be specific, FIG. 5 is a diagram showing the configuration of a rear surface of the cover 42. As shown in FIG. 5, insertion holes 42a and 42b and a groove portion 42c are formed on a contact surface P2 of the cover 42. The first fasteners 11 are inserted through the insertion holes 42a in the upward/downward direction (a direction perpendicular to the paper surface of FIG. 5; the same applies to the following), and the second fasteners 12 are inserted through the insertion holes 42b in the upward/downward direction. In a plan view, the groove portion 42c includes: a plurality of straight portions 42d and 42e; and corner portions 42f each provided between the straight portions 42d and 42e. Each of the straight portions 42d extends in the longitudinal direction of the electrical junction box 4, and the straight portion 42e extends in the width direction (short-length direction) of the electrical junction box 4.

Figure 6:
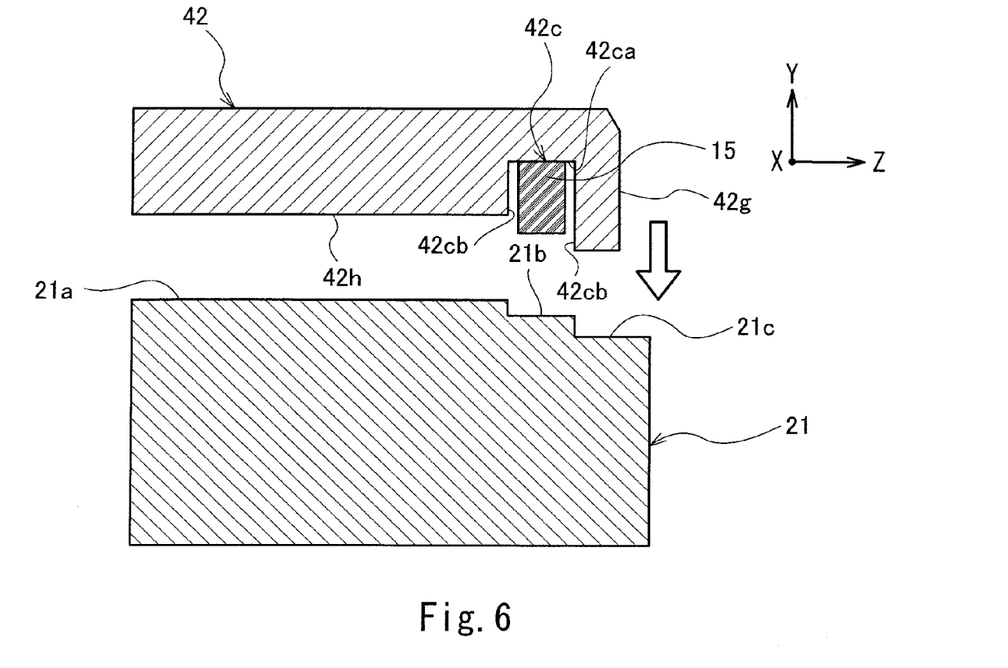
FIG. 6 is a cross-sectional view showing a state where the cover does not yet contact an upper elastic member of the electrical junction box of FIG. 2.

As described below, the groove portion 42c of the cover 42 is constituted by three regions, and the gasket 15 having a loop shape is fitted in the groove portion 42c. In the present embodiment, the gasket 15 is made of rubber. When the cover 42 and the box main body 41 are fixed to each other by the fasteners 11 and 12, the gasket 15 is sandwiched and pressed by the cover 42 and the box main body 41. As above, the gasket 15 has a substantially rectangular loop shape corresponding to the shape of the electrical junction box 4. Hereinafter, a direction parallel to a bottom surface 42ca of the groove portion 42c in which the gasket 15 is fitted and also parallel to a side surface 42cb of the groove portion 42c is defined as a "circumferential direction". A direction perpendicular to the bottom surface 42ca of the groove portion 42c and parallel to the side surface 42cb of the groove portion 42c is defined as a "height direction". A direction parallel to the bottom surface 42ca of the groove portion 42c and perpendicular to the side surface 42cb of the groove portion 42c is defined as a "width direction". For example, in FIG. 6 showing a cross section of a portion of the gasket 15, the portion extending in the short-length direction, the above defined directions are as below. That is, the "circumferential direction", the "height direction", and the "width direction" correspond to an "X direction", a "Y direction", and a "Z direction", respectively.

The gasket 15 includes small width portions 15a and large width portions 15b and 15c. The small width portions 15a and the large width portions 15b and 15c are alternately provided in the circumferential direction. A width W1 of the small width portion 15a is smaller than a width of the groove portion 42c. In the present embodiment, a cross section of the small width portion 15a in the height direction has a square shape. The large width portion 15b includes projections 15d projecting toward both respective sides of the small width portion 15a in the width direction and each having a substantially semi-circular shape in a plan view. The large width portion 15c includes projections 15e projecting toward both respective sides of the small width portion 15a in the width direction and each having a substantially rectangular shape in a plan view. The projections 15d and 15e are in contact with the side surfaces 42cb of the groove portion 42c. A width W2 of each of the large width portions 15b and 15c is substantially the same as the width of the groove portion 42c. Therefore, the width W2 of each of the large width portions 15b and 15c is larger than the width W1 of the small width portion 15a.

The gasket 15 includes: first regions A1 fitted in the corner portions 42f; second regions A2 fitted in the straight portions 42d except for the corner portions 42f; and third regions A3 fitted in the straight portions 42e. The small width portions 15a and the large width portions 15b are provided at the first region A1 and the second region A2, and only the small width portions 15a are provided at the third regions A3. In the second region A2, lengths of the small width portions 15a in the circumferential direction are equal to one another. Therefore, in the second region A2, the large width portions 15b are provided at regular intervals. The length of the small width portion 15a in the circumferential direction in the first region A1 is shorter than the length of the small width portion 15a in the circumferential direction in the second region A2. To be specific, in the first region A1, a clearance between the adjacent large width portions 15b and 15c and a clearance between the adjacent large width portions 15c are small, and a larger number of large width portions 15b and 15c than the number of small width portions 15a are preferentially provided.

As shown in FIG. 4, when the cover 42 is fixed to the box main body 41, the gasket 15 extends on an upper surface of the side wall portion 41b of the box main body 41 and an upper surface of the first projecting portion 21b of the upper elastic member 21. At this time, the large width portions 15b and 15c in the first region A1 of the gasket 15 are located adjacent to the upper elastic member 21. In the first region A1, a part of the projections 15d and 15e of the large width portions 15b and 15c overlap the upper elastic member 21 in a plan view.

As described above, the through holes 20b of the elastic member 20 accommodated adjacent to the corner portion of the side wall portion 41b are formed away from the insertion hole 20a toward the outer surface side of the elastic member 20. Therefore, a thickness between an outer surface of the elastic member 20 and an inner peripheral surface of the through hole 20b needs to be adequately secured. On the other hand, as explained above in reference to FIG. 3, the electrical junction box 4 is fixed so as to be inclined from the horizontal plane toward the side sill of the bogie frame 2. Therefore, the cover 42 and the fastener 50 are provided close to each other, so that the cover 42 and the fastener 50 need to be prevented from interfering with each other.

On this account, a thickness of the side wall portion 41b contacting the elastic member 20, that is, a thickness W3 of a vicinity of a corner portion of the side wall portion 41b needs to be determined such that the thickness between the outer surface of the elastic member 20 and the inner peripheral surface of the through hole 20b is adequately secured while providing the side wall portion 41b at such a position that the fastener 50 and the cover 42 are prevented from interfering with each other. As a result, the thickness W3 of the vicinity of the corner portion of the side wall portion 41b is smaller than the width W2 of each of the large width portions 15b and 15c of the gasket 15.

FIG. 6 is a cross-sectional view showing a state where the cover 42 does not yet contact the upper elastic member 21 of the electrical junction box 4 of FIG. 2. As shown in FIG. 6, the upper elastic member 21 includes the main body portion 21a, the first projecting portion 21b, and the second projecting portion 21c in this order from an inner side to an outer side, and steps are formed such that the heights of these portions 21a to 21c decrease toward the outer side. Each of the steps has a right-angled shape.

As described above, the extension portion 42g projecting downward is formed at the peripheral edge of the cover 42. The extension portion 42g opposes the second projecting portion 21c of the upper elastic member 21. When the cover 42 and the box main body 41 face each other, the extension portion 42g and an upper surface of the second projecting portion 21c contact each other. Further, the gasket 15 attached to the cover 42 opposes the first projecting portion 21b of the upper elastic member 21. When the cover 42 and the box main body 41 face each other, the gasket 15 and the first projecting portion 21b contact each other. Furthermore, a flat surface portion 42h of the cover 42 opposes the main body portion 21a of the upper elastic member 21. When the cover 42 and the box main body 41 face each other, the flat surface portion 42h and the main body portion 21a contact each other.

According to the configuration explained as above, the gasket 15 includes the small width portions 15a and the large width portions 15b and 15c each having a larger width than the width of the small width portion 15a, and the large width portions 15b and 15c and the small width portions 15a are provided alternately in the circumferential direction. With this, each of the large width portions 15b and 15c can contact both side surfaces 42cb of the groove portion 42c, and it becomes easy to position the small width portion 15a at a center of the groove portion 42c in the width direction. With this, a clearance between the small width portion 15a and one of both side surfaces 42cb of the groove portion 42c and a clearance between the small width portion 15a and the other of both side surfaces 42cb of the groove portion 42c are maintained so as to be substantially equal to each other. When the cover 42 and the side wall portion 41b of the box main body 41 face each other, the deformation of the small width portions 15a in the groove portion 42c becomes uniform in the circumferential direction. Thus, repulsive force of the gasket 15 stabilizes. Therefore, water-tightness between the box main body 41 and the cover 42 is secured, and the water can be prevented from intruding into the electrical junction box 4 from the outer space.

Further, since it becomes easy to position the small width portion 15a of the gasket 15 at the center of the groove portion 42c in the width direction, an expansion margin is formed between the groove portion 42c and the small width portion 15a. With this, even if the electrical junction box 4 is placed under a high-temperature circumstance during the operation of the railcar or the like, a case where excessive pressure acts on the cover 42 by the heat expansion of the gasket 15 can be prevented. Thus, the electrical junction box 4 can be prevented from cracking or the like. Therefore, the pressure acting on the cover 42 by the heat expansion can be reduced.

The length of the small width portion 15a in the circumferential direction at the corner portion 42f where the gasket 15 tends to meander is shorter than the length of the small width portion 15a in the circumferential direction at the straight portion 42d. To be specific, the clearance between the adjacent large width portions 15b and 15c and the clearance between the adjacent large width portions 15c are small, and at the corner portion 42f, a larger number of large width portions 15b and 15c than the number of small width portions 15a are preferentially provided. With this, at the corner portion 42f of the groove portion 42c, the small width portion 15a of the gasket 15 is more easily positioned at the center in the width direction, so that the water-tightness can be improved.

The width W2 of each of the large width portions 15b and 15c of the gasket 15 is substantially equal to the width of the groove portion 42c, and the large width portions 15b and 15c contact the side surfaces 42cb of the groove portion 42c of the cover 42. Therefore, when attaching the cover 42, in which the gasket 15 is fitted, to the box main body 41, the gasket 15 hardly falls off from the cover 42.

When the cover 42 and the box main body 41 face each other, the projection 15e adjacent to (the upper elastic member 21 of) the elastic member 20 overlaps the elastic member 20 at the corner portion 42f of the groove portion 42c. Therefore, the large width portion 15c of the gasket 15 contacts the elastic member 20, so that the water-tightness between the elastic member 20 and the gasket 15 can also be secured.

When the cover 42 and the box main body 41 face each other, the extension portion 42g of the cover 42 contacts the upper surface of the second projecting portion 21c of the upper elastic member 21. With this, the water-tightness between the extension portion 42g of the cover 42 and the second projecting portion 21c of the upper elastic member 21 is secured, so that the water from the outside can be stopped before the water reaches the main body portion 21a. Further, the flat surface portion 42h of the cover 42 also contacts the upper surface of the main body portion 21a of the upper elastic member 21. With this, even if there is intrusion into between the extension portion 42g and the second projecting portion 21c and between the gasket 15 and the first projecting portion 21b to reach the main body portion 21a, the flat surface portion 42h contacts the upper surface of the main body portion 21a to secure the water-tightness. Therefore, the water from the outside can be stopped before the water reaches the terminal 3b and the stud terminal 10 provided at an inner side of the main body portion 21a in the longitudinal direction of the electrical junction box 4.

Second Embodiment

Next, an electrical junction box 14 according to the second embodiment will be explained. In the first embodiment, the gasket is provided at the cover. However, in the present embodiment, the gasket is provided at the box main body.

Figure 7:
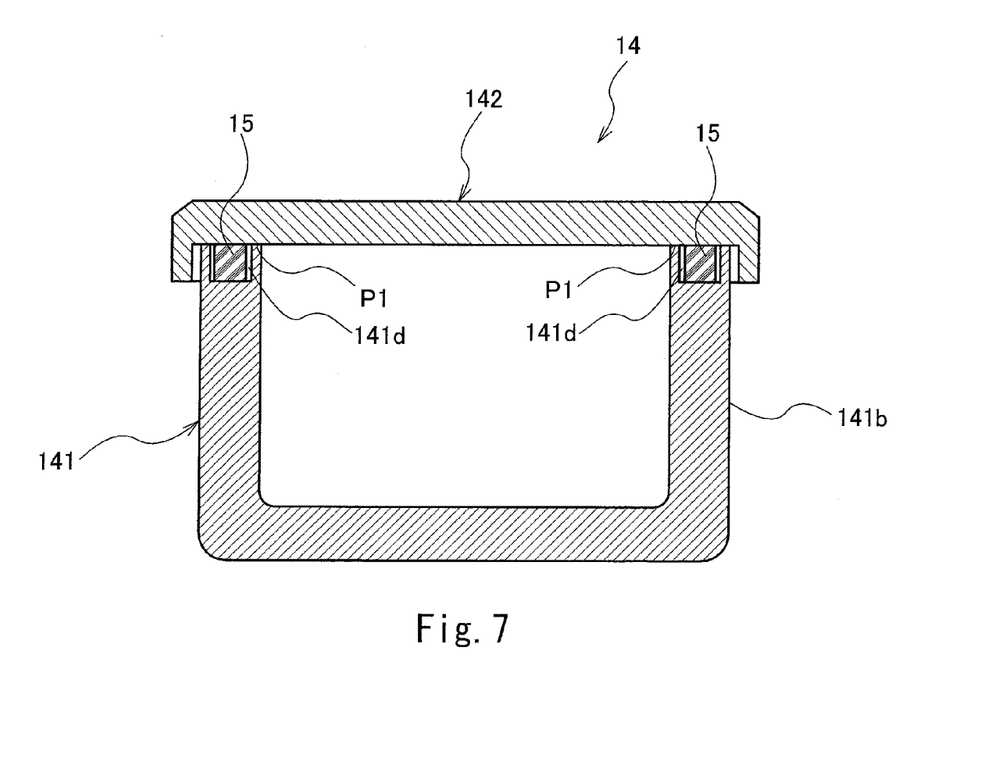
FIG. 7 is a schematic cross-sectional view showing the electrical junction box of the railcar according to a second embodiment.

FIG. 7 is a schematic cross-sectional view showing the electrical junction box 14 of the railcar according to the second embodiment. As shown in FIG. 7, a groove portion 141d is formed on a contact surface P1 of a side wall portion 141b of a box main body 141 of the electrical junction box 14. The gasket 15 is fitted in the groove portion 141d of the box main body 141. When fixing a cover 142 to the box main body 141, the gasket 15 is pressed by the cover 142. The gasket 15 herein is the same in configuration as the gasket of the first embodiment.

According to the configuration explained as above, as with the first embodiment, when the cover 142 and the side wall portion 141b of the box main body 141 face each other, the deformation of the small width portions 15a in the groove portion 142d becomes uniform in the circumferential direction. Thus, the repulsive force of the gasket 15 stabilizes. Therefore, the water-tightness between the box main body 141 and the cover 142 is secured, and the water can be prevented from intruding into the electrical junction box 14 from the outer space. Further, since it becomes easy to position the small width portion 15a of the gasket 15 at the center of the groove portion in the width direction, the expansion margin is formed between the groove portion 141d and the small width portion 15a. With this, even if the electrical junction box 14 is placed under a high-temperature circumstance during the operation of the railcar or the like, a case where excessive pressure acts on the box main body 141 by the heat expansion of the gasket 15 can be prevented. Thus, the electrical junction box 4 can be prevented from cracking or the like. Since the other components are the same as the components of the first embodiment, explanations thereof are omitted.

Third Embodiment

Figure 8:
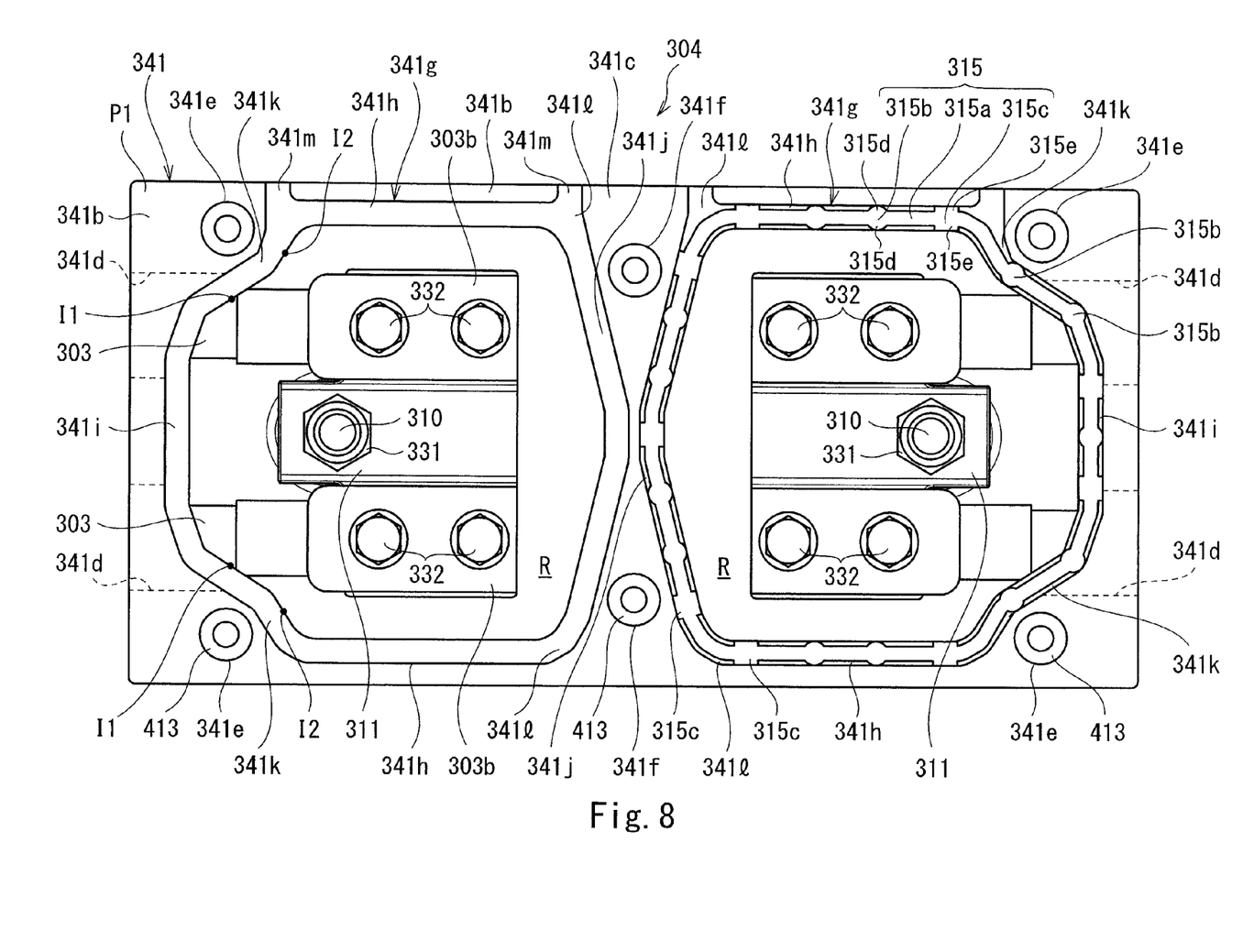
FIG. 8 is a plan view showing the box main body of the electrical junction box of the railcar according to a third embodiment.

An electrical junction box 304 according to the third embodiment is an electrical junction box obtained by partially modifying the shape and configuration of the electrical junction box 4 according to the first embodiment. The following will mainly explain differences between the electrical junction box 304 of the third embodiment and the electrical junction box 4 of the first embodiment. FIG. 8 is a plan view showing a box main body 341 of the electrical junction box 304. As shown in FIG. 8, the electrical junction box 304 includes the box main body 341. A cover which is the same as the cover 142 of FIG. 7 is attached to the box main body 341. The box main body 341 includes a bottom wall portion 341a, a side wall portion 341b, and a dividing wall portion 341c. In a space R surrounded by the bottom wall portion 341a, the side wall portion 341b, and the dividing wall portion 341c, a stud terminal 310 projecting from a fuse box and an electrically conductive spacer 311 electrically connected to the stud terminal 310 are accommodated.

The electrically conductive spacer 311 is fitted in the stud terminal 310 and attached to the stud terminal 310 by a nut 331. A terminal 303b of an electric cable 303 is attached to the electrically conductive spacer 311 by fasteners 332 (such as bolts). The electric cable 303 is introduced into the electrical junction box 304 through a through hole 341d formed in a short-length direction of the electrical junction box 304. A gap between the electric cable 303 and the through hole 341d is sealed by using a cable gland (not shown). With this, the water-tightness between the electric cable 303 and the box main body 341 is secured, and the water is prevented from intruding into the electrical junction box 304 from the outer space.

In a state where the electrical junction box 304 is attached to the railcar, a contact surface P1 of the box main body 341 is inclined from the horizontal plane. The contact surface P1 includes: first holes 341e formed at four corner portions; second holes 341f formed at a middle portion of the box main body 341 in the longitudinal direction; and groove portions 341g in each of which a gasket 315 is fitted. The first holes 341e and the second holes 341f are holes through which fasteners (such as bolts) for fastening the box main body 341 and the cover to each other are inserted. Although not shown, the cover also includes holes through which the fasteners are inserted. Nuts are inserted in the first holes 341e and the second holes 341f at the time of molding. When the bolts as the fasteners are threadedly engaged with these nuts, the cover is fixed to the box main body 341. As with the first embodiment, substantially cylindrical spacers 413 may be inserted in the holes 341e and 341f.

Next, details of the configuration of the groove portion 341g will be explained.

As described above, the groove portions 341g are formed on the contact surface P1 of the box main body 341. In a plan view, a pair of groove portions 341g are formed at left and right sides. The shapes of the groove portions 341g are symmetrical with respect to a line extending in a short-length direction through a center of the electrical junction box 304 in the longitudinal direction. In FIG. 8, the gasket 315 fitted in the groove portion 341g located at one side of the box main body 341 in the longitudinal direction is not shown for ease of explanation.

The groove portion 341g includes a plurality of straight portions 341h, 341i, and 341j and a plurality of corner portions 341k and 341l. The straight portion 341h extends in the longitudinal direction of the electrical junction box 304, and the straight portions 341i and 341j extend in the short-length direction of the electrical junction box 304. The first hole 341e is located on an extended line of the straight portion 341h.

The corner portion 341k is provided between the straight portion 341h and the straight portion 341i. The corner portions 341k are formed at four respective corner portions of the box main body 341. The corner portion 341k curves so as to bypass the first hole 341e and includes two inflection points I1 and I2. To be specific, the corner portion 341k meanders so as to avoid the first hole 341e.

The corner portion 341l is provided between the straight portion 341h and straight portion 341j. The corner portions 341l are formed at the middle portion of the box main body 341 in the longitudinal direction. Unlike the corner portion 341k, the corner portion 341l does not meander between the straight portion 341h and straight portion 341j and does not include the inflection point.

As shown in FIG. 8, drain passages 341m through which the groove portion 341g is open to the outside are formed at the corner portions 341k and 341l located at an upper side in FIG. 8. When the electrical junction box 304 is attached to the railcar, the drain passages 341m are inclined from the horizontal plane. With this, even if the water intrudes into the groove portions 341g, the water can be discharged to the outside of the box main body 341 through the drain passages 341m.

Next, the configuration of the gasket 315 fitted in the groove portion 341g will be explained.

The gasket 315 is a loop-shaped member and includes: small width portions 315a; first large width portions 315b each having first projections 315d; and second large width portions 315c each having second projections 315e. The small width portion 315a, the first large width portion 315b, and the second large width portion 315c are alternately provided in the circumferential direction. The large width portions 315b and 315c are provided at substantially regular intervals in the circumferential direction.

The first projection 315d of the first large width portion 315b has such a shape that as the first projection 315d extends toward an outer side of the small width portion 315a in the width direction, a length of the first projection 315d in the circumferential direction decreases. To be specific, the first projection 315d has a shape that tapers toward the outer side of the small width portion 315a in the width direction. Specifically, the first projection 315d has a substantially semi-circular shape in a plan view. The shape of the first projection 315d is not limited to the substantially semi-circular shape and may be the other shape. For example, the shape of the first projection 315d may be a triangular shape having an apex contacting an inner surface of the groove portion 341g or may be a trapezoidal shape.

The second projection 315e of the second large width portion 315c has such a shape that as the second projection 315e extends toward the outer side of the small width portion 315a in the width direction, a length of the second projection 315e in the circumferential direction is constant. Specifically, the second projection 315e has a substantially rectangular shape in a plan view.

The first large width portion 315b of the gasket 315 is fitted in the corner portion 341k including the inflection points I1 and I2, that is, in the meandering corner portion 341k. On the other hand, the second large width portion 315c of the gasket 315 is fitted in the corner portion 341l which does not include the inflection point. The other configuration is the same as the configuration of the first embodiment.

The third embodiment configured as above can obtained the same effects as the first embodiment. Further, in the third embodiment, the first large width portion 315b is fitted in the meandering corner portion 341k. Therefore, a contact area between the first large width portion 315b and the corner portion 341k tends to become small. Since the first large width portion 315b is in point contact with the groove portion 341g, pressure applied from the corner portion 341k to the first large width portion 315b hardly influences the small width portion 315a. With this, the small width portion 315a of the gasket 315 is easily positioned at the center in the width direction. As a result, even at the corner portion 341k, the deformation of the small width portion 15a becomes uniform in the circumferential direction. Thus, the repulsive force of the gasket 315 stabilizes. Therefore, the water-tightness between the box main body 341 and the cover can be secured, and the water can be prevented from intruding into the electrical junction box 304 from the outer space.

When the box main body and cover of the electrical junction box are made of resin, fastening power of the bolts by which the box main body and the cover are fastened to each other may be limited to prevent the box main body and the cover from cracking. According to the present embodiment, even when the fastening power of the bolts is limited as above, the small width portions 315a of the gasket 315 can be positioned at the center of the groove portion in the width direction at not only the meandering corner portions 341k but also any portion of the groove portion 341g. Thus, the repulsive force of the gasket 315 stabilizes in the entire groove portion 341g. As a result, when the box main body and the cover are fastened to each other, the gasket 315 uniformly deforms. Therefore, even when the electrical junction box is made of resin, the water-tightness between the box main body and the cover can be adequately secured.

Fourth Embodiment

Figure 9:
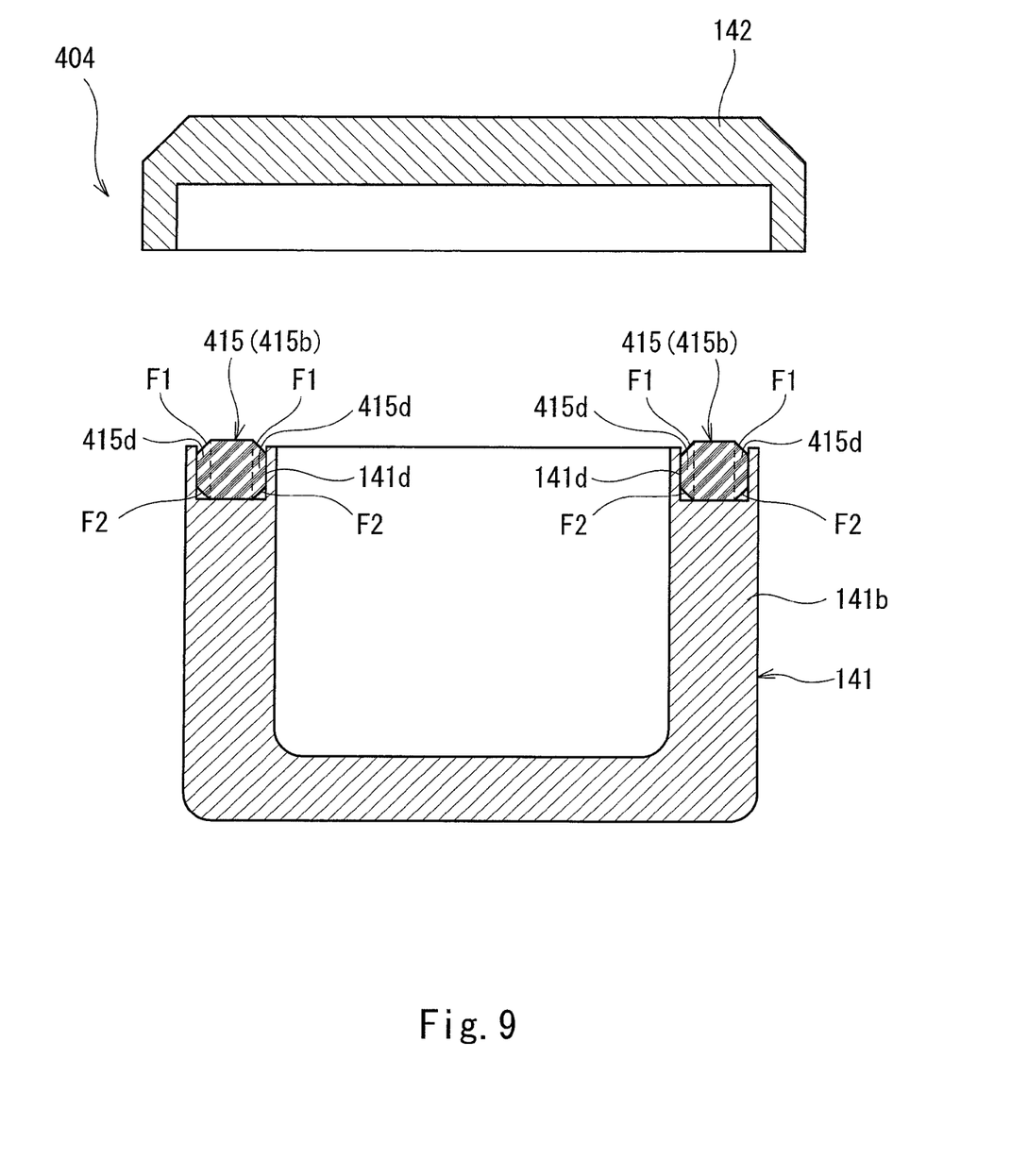
FIG. 9 is an exploded cross-sectional view showing the electrical junction box of the railcar according to a fourth embodiment.

An electrical junction box 404 of a railcar according to the fourth embodiment is an electrical junction box obtained by partially modifying the shape of the gasket 15 of the electrical junction box 14 according to the second embodiment. The following will mainly explain differences between a gasket 415 of the fourth embodiment and the gasket 15 of the second embodiment. FIG. 9 is an exploded cross-sectional view showing the electrical junction box 404 of the railcar according to the fourth embodiment. As shown in FIG. 9, an end surface F1 of a projection 415d of a large width portion 415b is inclined toward a bottom surface of the groove portion 141d, the end surface F1 being located at an opening side of the groove portion 141d. To be specific, the surface F1 that is an upper surface of the projection 415d of the large width portion 415b is an inclined surface that is inclined so as to get close to the bottom surface of the groove portion 141d.

An end surface F2 of the projection 415d is inclined toward the opening of the groove portion 141d, the end surface F2 being located at a side opposite to the opening side of the groove portion 141d. To be specific, the surface F2 that is a lower surface of the projection 415d is an inclined surface that is inclined away from the bottom surface of the groove portion 141d. Therefore, the large width portion 415b does not contact a corner portion where the side surface and bottom surface of the groove portion 141d intersect with each other. An inclination angle of the surface F2 and an inclination angle of the surface F1 are substantially equal to each other. As above, a cross-sectional shape of the gasket 415 is a hexagonal shape. The other configuration is the same as the configuration of the second embodiment. The cross-sectional shape of the gasket 415 is not limited to the hexagonal shape and may be a cross shape.

According to the electrical junction box 404 of the fourth embodiment, it is possible to reduce a filling rate of the gasket 415 in the groove portion 141d when the large width portions 415b deform by causing the cover 142 to face the side wall portion 141b of the box main body 141. Therefore, even when the gasket 415 deforms, the gasket 415 is prevented from protruding from the groove portion 141d.

As above, the electrical junction box 404 according to the fourth embodiment has an effect of easily securing the water-tightness between the box main body 141 and the cover 142 by the above configuration in addition to the effects of the second embodiment. Therefore, the water-tightness between the box main body 141 and the cover 142 can be secured while positioning the gasket 415 in the groove portion 141d.

Further, in the present embodiment, the surface F2 that is the lower surface of the projection 415d is also inclined. Therefore, the large width portion 415b tends to deform more uniformly in the groove portion 141d. Further, a cross section of the gasket 415 in the height direction has a symmetrical shape. If the gasket has an asymmetrical shape, an attaching direction of the gasket is limited. Therefore, the attaching of the gasket may be mistaken by an operator. However, since the attaching direction of the gasket 415 having the symmetrical shape is not limited, the mistake of the attaching of the gasket by the operator can be prevented, and work efficiency can be improved.

The above embodiments may be combined arbitrarily. For example, a part of components or methods in one embodiment may be applied to another embodiment. Further, a part of components in an embodiment may be separated and extracted arbitrarily from the other components in the embodiment. The cross-sectional shape of the small width portion 15a of the gasket 15 is a square shape in the above embodiments but may be a circular shape.

Further, in the above embodiments, the elastic member 20 is divided into upper and lower parts. However, the elastic member 20 does not have to be divided into the upper and lower parts, and a linear cut extending from the upper surface or lower surface of the elastic member to the insertion hole may be made. With this, the electric cable 3 may be inserted into the insertion hole through this linear cut. In the above embodiments, the power is supplied from the current collector provided at the bogie 1 through the electric cable 3 to the carbody. However, a motor may be attached to the bogie 1, and the power may be supplied from the carbody through the electric cable to the motor. The above embodiments explain a case where the electrical junction box 4 is fixed to the side sill of the bogie frame 2 through the mounting brackets 5. However, the electrical junction box 4 may be fixed to an underfloor portion of the carbody. For example, if the electrical junction box 4 is fixed to the underfloor portion of the carbody, instead of the stud terminal 10 and the like, an inverter which controls the railcar, a control board, and electrical apparatuses such as a detector may be accommodated in an internal space of the electrical junction box 4.

What is claimed is:

1. A gasket for an electrical junction box of a railcar, the electrical junction box including: a box main body including a side peripheral wall portion defining an opening communicating with an outer space of the box main body; and a cover closing the opening,
the gasket being fitted in a groove portion formed on a contact surface of the side peripheral wall portion or a contact surface of the cover,
the gasket comprising:
small width portions, a width of each of the small width portions being smaller than a width of the groove portion; and
large width portions each having projections projecting toward both respective sides of the small width portion in a width direction and having a larger width than the width of the small width portions,
the small width portions and the large width portions being alternately provided.

2. The gasket according to claim 1, wherein:
the gasket has a loop shape and is fitted in the groove portion, the groove portion including straight portions and corner portions;
the gasket includes first regions fitted in the corner portions and second regions fitted in the straight portions; and
a length of each of the small width portions in a circumferential direction at one of the first regions is shorter than a length of each of the small width portions in the circumferential direction at the second region.

3. The gasket according to claim 1, wherein:
the gasket has a loop shape and is fitted in the groove portion, the groove portion including straight portions and corner portions, each of the corner portions having at least one inflection point; and
each of the projections of the large width portions fitted in the corner portion has such a shape that a length of the projection of the large width portions in the circumferential direction of the gasket decreases as the projection extends toward an outer side of the small width portions in the width direction.

4. The gasket according to claim 1, wherein an end surface of the projection of each of the large width portions is inclined toward a bottom surface of the groove portion, the end surface being located on the same side of the groove portion as the opening.

5. An electrical junction box of a railcar, the electrical junction box comprising:
   a box main body including a side peripheral wall portion defining an opening communicating with an outer space of the box main body;
   a cover closing the opening;
   a gasket fitted in a groove portion formed on a contact surface of the side peripheral wall portion or a contact surface of the cover; and
   an elastic member accommodated in the box main body so as to be located adjacent to one of the side wall portions,
   the gasket including
      a plurality of small width portions, a width of each of the small width portions being smaller than a width of the groove portion, and
      a plurality of large width portions, each of the large width portions having projections projecting toward both respective sides of the small width portions in a width direction and having a larger width than the small width portions,
   the small width portions and the large width portions being alternately provided, and
   one of the projections of the large width portion located adjacent to the elastic member among the plurality of large width portions overlapping the elastic member.

6. An electrical junction box of a railcar, the electrical junction box comprising:
   a box main body including a side peripheral wall portion defining an opening communicating with an outer space of the box main body;
   a cover closing the opening; and
   a loop-shaped gasket fitted in a groove portion formed on a contact surface of the side peripheral wall portion or a contact surface of the cover,
   the groove portion including straight portions and corner portions, each of the corner portions including at least one inflection point,
   the gasket including
      small width portions, a width of each of the small width portions being smaller than a width of the groove portion, and
      large width portions each having projections projecting toward both respective sides of the small width portions in a width direction and having a larger width than the small width portions,
   the small width portions and the large width portions being alternately provided, and
   each of the projections of the large width portions fitted in the corner portion having such a shape that a length of the projections of the large width portions in the circumferential direction of the gasket decreases as the projections extend toward an outer side of the small width portions in the width direction.

7. The electrical junction box according to claim 6, wherein:
   the box main body includes holes, fasteners being inserted through the holes, the fasteners fastening the cover to the box main body;
   the holes are located on extended lines of the straight portions; and
   the corner portions curve so as to bypass the holes.

8. The electrical junction box according to claim 6, wherein:
   the contact surface is inclined from a horizontal plane in a state where the electrical junction box is attached to the railcar; and
   a drain passage is formed at a portion of the inclined contact surface, the portion being located at a vertically lower side, the groove portion being open to an outside through the drain passage.

* * * * *